US012789286B2

(12) United States Patent
Chenot et al.

(10) Patent No.: US 12,789,286 B2
(45) Date of Patent: Nov. 10, 2026

(54) HANDHELD LASER WELDING DEVICE

(71) Applicant: Lincoln Global, Inc., Santa Fe Springs, CA (US)

(72) Inventors: Jillian J. Chenot, North Olmsted, OH (US); Sheldon A. Wray, Eastlake, OH (US); Joseph J. Skerbec, Novelty, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 1010 days.

(21) Appl. No.: 17/974,711

(22) Filed: Oct. 27, 2022

(65) Prior Publication Data

US 2023/0158601 A1 May 25, 2023

Related U.S. Application Data

(60) Provisional application No. 63/281,116, filed on Nov. 19, 2021.

(51) Int. Cl.
*B23K 26/03* (2006.01)
*B23K 26/08* (2014.01)
(Continued)

(52) U.S. Cl.
CPC .......... *B23K 26/03* (2013.01); *B23K 26/0884* (2013.01); *B23K 26/21* (2015.10); *B23K 26/702* (2015.10); *B23K 37/006* (2013.01)

(58) Field of Classification Search
CPC .... B23K 26/03; B23K 26/0884; B23K 26/21; B23K 26/702; B23K 37/006;
(Continued)

(56) References Cited

U.S. PATENT DOCUMENTS 5,147,999 A 9/1992 Dekumbis et al.
5,247,155 A 9/1993 Steen et al.
(Continued)

FOREIGN PATENT DOCUMENTS

CN 210755928 U 6/2020
CN 212169388 U 12/2020
(Continued)

OTHER PUBLICATIONS

International Search Report and Written Opinion from Corresponding International Application No. PCT/US2022-050110; Dated Mar. 2, 2023; pp. 1-15.

*Primary Examiner* — Justin C Dodson
*Assistant Examiner* — Keith Brian Assante
(74) *Attorney, Agent, or Firm* — Brad C. Spencer

(57) ABSTRACT

A laser welding system includes a laser power supply having a controller that controls activation of laser light by the power supply. A sense lead is attachable to a workpiece. A handheld laser welding torch is connected to the power supply to receive the laser light. The torch includes a nozzle having an electrically insulating outer surface, and a pressure sensor that measures a pressure level applied to the nozzle and generates a pressure level signal. A proximity sensor is operatively connected to the sense lead and the torch and is configured to determine whether the torch is adjacent to the workpiece and generate a proximity signal. The controller receives the pressure level signal and the proximity signal. The controller activates the laser light when the pressure level applied to the nozzle meets or exceeds a threshold and the proximity signal indicates that the torch is adjacent to the workpiece.

23 Claims, 4 Drawing Sheets

(51) Int. Cl.

| | |
|---|---|
| ***B23K 26/21*** | (2014.01) |
| ***B23K 26/70*** | (2014.01) |
| ***B23K 37/006*** | (2025.01) |

(58) Field of Classification Search

CPC .............. B23K 26/037; B23K 26/1464; B23K 26/706; B23K 26/0096

See application file for complete search history.

(56) References Cited

U.S. PATENT DOCUMENTS

| | | | | |
|---|---|---|---|---|
| 5,360,426 | A | 11/1994 | Müller et al. | |
| 5,422,456 | A | 6/1995 | Dahm | |
| 10,448,692 | B2 | 10/2019 | Hsu | |
| 10,505,289 | B1 | 12/2019 | Trussell | |
| 2003/0172032 | A1 * | 9/2003 | Choquet | G06Q 30/06 705/51 |
| 2004/0169021 | A1 * | 9/2004 | Baker | B23K 26/144 219/121.84 |
| 2005/0103755 | A1 * | 5/2005 | Baker | B23K 26/16 219/121.84 |
| 2007/0158323 | A1 * | 7/2007 | Enyedy | B23K 9/1336 219/137.71 |
| 2007/0262058 | A1 * | 11/2007 | Ulrich | B23K 9/205 219/99 |
| 2009/0139967 | A1 * | 6/2009 | Baker | B23K 26/703 219/121.63 |
| 2014/0017641 | A1 | 1/2014 | Nowacki | |
| 2014/0277322 | A1 * | 9/2014 | Victorine | A61N 1/05 607/116 |
| 2014/0277595 | A1 | 9/2014 | Nixon et al. | |
| 2016/0001389 | A1 * | 1/2016 | Kim | B23K 9/173 219/125.12 |
| 2019/0202001 | A1 * | 7/2019 | Spörl | G01D 5/2417 |
| 2019/0299317 | A1 | 10/2019 | Wada | |
| 2021/0016385 | A1 | 1/2021 | Hsu et al. | |

FOREIGN PATENT DOCUMENTS

| | | | |
|---|---|---|---|
| CN | 212350766 | U | 1/2021 |
| EP | 1 472 042 | A1 | 11/2004 |
| EP | 1 853 405 | A2 | 11/2007 |
| EP | 3 302 873 | B1 | 9/2020 |
| JP | H09-057482 | A2 | 3/1997 |

* cited by examiner

HANDHELD LASER WELDING DEVICE

CROSS-REFERENCE TO RELATED APPLICATIONS

The present application claims priority to U.S. Provisional Patent Application Ser. No. 63/281,116 filed on Nov. 19, 2021, the disclosure of which is incorporated herein by reference.

BACKGROUND OF THE INVENTION

Field of the Invention

Embodiments of the present invention relate to laser devices. More specifically, embodiments of the present invention relate to handheld laser devices, systems, and methods, for example, for welding and cutting.

Description of Related Art

Handheld laser devices can be very effective in executing certain types of welding or cutting procedures on workpieces. However, when using such devices, the accidental emission of laser light into free space or in an otherwise unwanted or unintended direction away from the workpiece is generally undesirable. Furthermore, performance improvements with respect to certain aspects of handheld laser devices are desired.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a laser welding system. The laser welding system includes a laser power supply having a controller that controls activation of laser light by the laser power supply. A sense lead is attachable to a workpiece to be welded. A handheld laser welding torch is operatively connected to the laser power supply to receive the laser light from the laser power supply. The handheld laser welding torch includes a nozzle having an electrically insulating outer surface, and a pressure sensor that measures a pressure level applied to the nozzle and generates a corresponding pressure level signal. The laser welding system further includes a proximity sensor that is operatively connected to the sense lead and the handheld laser welding torch and that is configured to determine whether the handheld laser welding torch is adjacent to the workpiece and generate a corresponding proximity signal. The controller receives the pressure level signal from the pressure sensor and the proximity signal from the proximity sensor. The controller is configured to activate the laser light when the pressure level applied to the nozzle meets or exceeds a threshold and the proximity signal indicates that the handheld laser welding torch is adjacent to the workpiece.

In accordance with another aspect of the present invention, provided is a laser welding system. The laser welding system includes a laser power supply having a controller that controls activation of laser light by the laser power supply. A sense lead is attachable to a workpiece to be welded. A handheld laser welding torch is operatively connected to the laser power supply to receive the laser light from the laser power supply. The handheld laser welding torch includes a nozzle and a pressure sensor that senses a pressure level applied to the nozzle and generates a corresponding pressure signal. The laser welding system further includes a proximity sensor that is operatively connected to the sense lead and the handheld laser welding torch and that is configured to determine whether the handheld laser welding torch is adjacent to the workpiece and generate a corresponding proximity signal. The controller receives the pressure signal from the pressure sensor and the proximity signal from the proximity sensor. The controller is configured to activate the laser light when the pressure level applied to the nozzle meets or exceeds a threshold and the proximity signal indicates that the handheld laser welding torch is adjacent to the workpiece.

In accordance with another aspect of the present invention, provided is a laser welding system. The laser welding system includes a laser power supply having a controller that controls activation of laser light by the laser power supply. A sense lead is attachable to a workpiece to be welded. A handheld laser welding torch is operatively connected to the laser power supply to receive the laser light from the laser power supply. The handheld laser welding torch includes a nozzle and a pressure sensor that generates a pressure signal based on a pressure level applied to the nozzle. The laser welding system further includes means for determining that the handheld laser welding torch is adjacent to a workpiece to be welded and generating a corresponding proximity signal. The controller receives the pressure signal from the pressure sensor and the proximity signal from the proximity sensor. The controller is configured to activate the laser light when the pressure level applied to the nozzle meets or exceeds a threshold and the proximity signal indicates that the handheld laser welding torch is adjacent to the workpiece.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
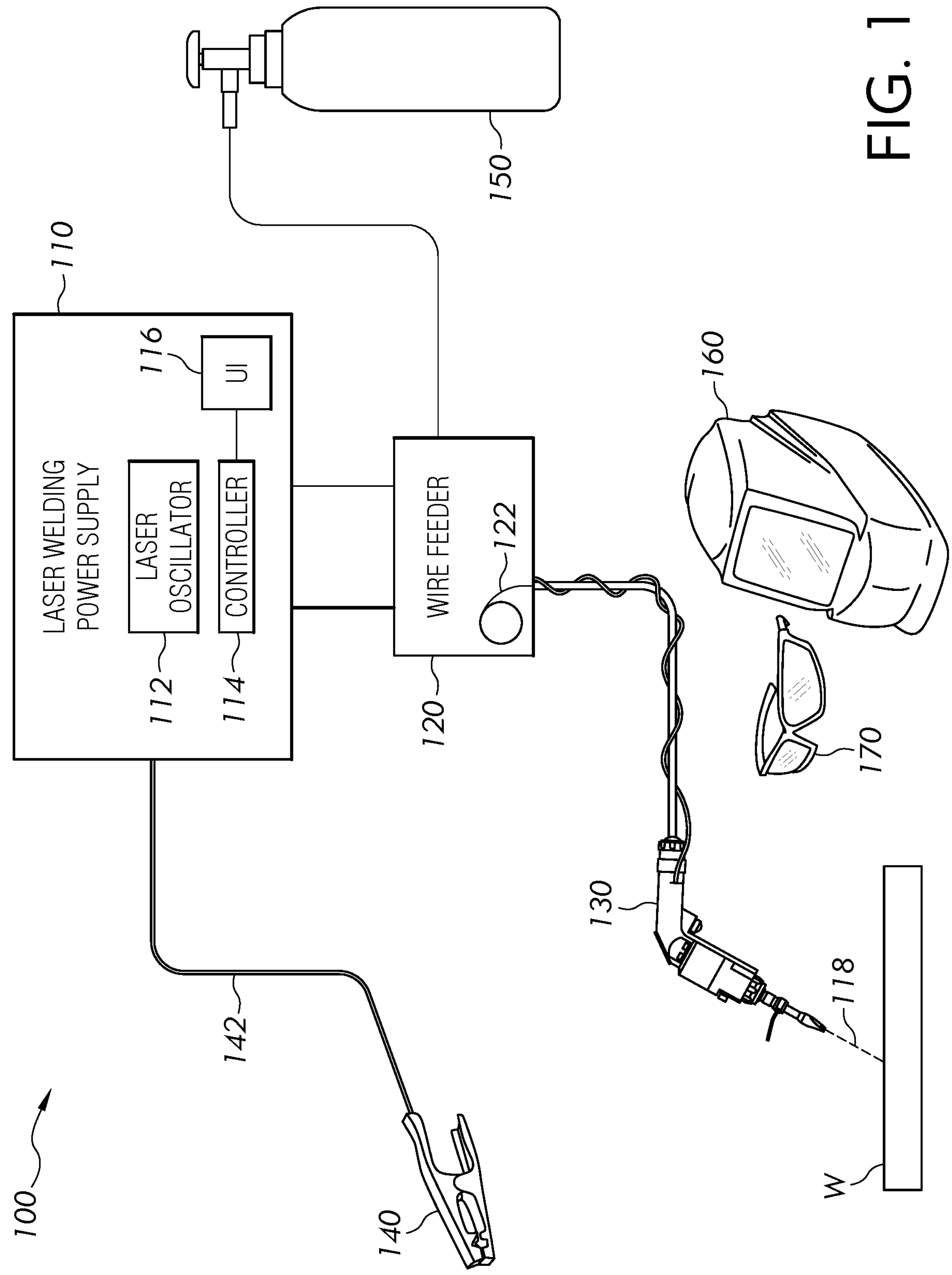
FIG. 1 is a system block diagram illustrating one embodiment of a laser welding system.

The present invention relates to handheld laser devices for welding and cutting. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

While embodiments of the present invention described herein are discussed in the context of laser welding, other embodiments of the invention are not limited thereto. For example, embodiments can be utilized in laser cutting operations. As used herein, the terms "welding" or "laser welding" are intended to encompass both laser welding and cutting. In the interest of efficiency, the term "welding" is used below in the description of exemplary embodiments, but is intended to include both welding and cutting.

FIG. 1 is a system block diagram illustrating one embodiment of a laser welding or cutting system 100 (referred to hereinafter as a laser welding system for ease of explanation). The laser welding system 100 includes a handheld laser welding/cutting torch 130 or gun and is configured to manual operation by an operator. The laser welding system 100 includes, among other things, a laser power supply 110 having a laser oscillator 112, a controller 114 and a user interface 116. The controller 114 is operatively connected to the laser oscillator 112 to control activation of laser light 118 by the laser power supply 110. The controller 114 is also operatively connected to the user interface 116. The user interface 116 allows an operator to set and observe various operating parameters of the laser power supply 110. The structure and operation of laser power supplies are known in the art and need not be described in detail herein.

The certain embodiments, laser welding system 100 also includes a wire feeder 120. The wire feeder 120 feeds a consumable wire 122 to the torch 130. The consumable wire 122 can act as a filler wire that is melted by laser energy during welding. In certain embodiments, the consumable wire 122 can be a so-called hot wire that is preheated by the wire feeder 120 or torch 130 prior to discharge from the torch toward the weld zone on a workpiece W. The preheated consumable wire 122 is subsequently melted by the laser light 118. If an electric arc is produced between the heated consumable wire 122 and the workpiece W, the laser light 118 can be automatically disabled. Similarly, the hot wire power supply and wire feeder 120 can be disabled when the torch 130 is removed from the workpiece W.

The handheld laser welding torch 130 is operatively connected to the laser power supply 110 to receive the laser light 118 from the laser power supply. The torch 130 can include laser optics to direct and/or focus the laser light from the laser power supply 110 toward the weld zone. The laser welding system 100 can further include a welding work clamp 140 and sense lead 142, a cylinder of shielding gas 150, a protective helmet 160, and laser shielding glasses 170 configured to be worn under the protective helmet 160. Laser energy (e.g., laser light 118) is provided from the laser power supply 110 to the torch 130 via the wire feeder 120, in accordance with one embodiment. Alternatively, laser energy is provided from the laser power supply 110 directly to the torch 130 via appropriate optical cabling. Even though various aspects are discussed herein in terms of laser welding, applications to laser cutting are valid as well.

Figure 2:
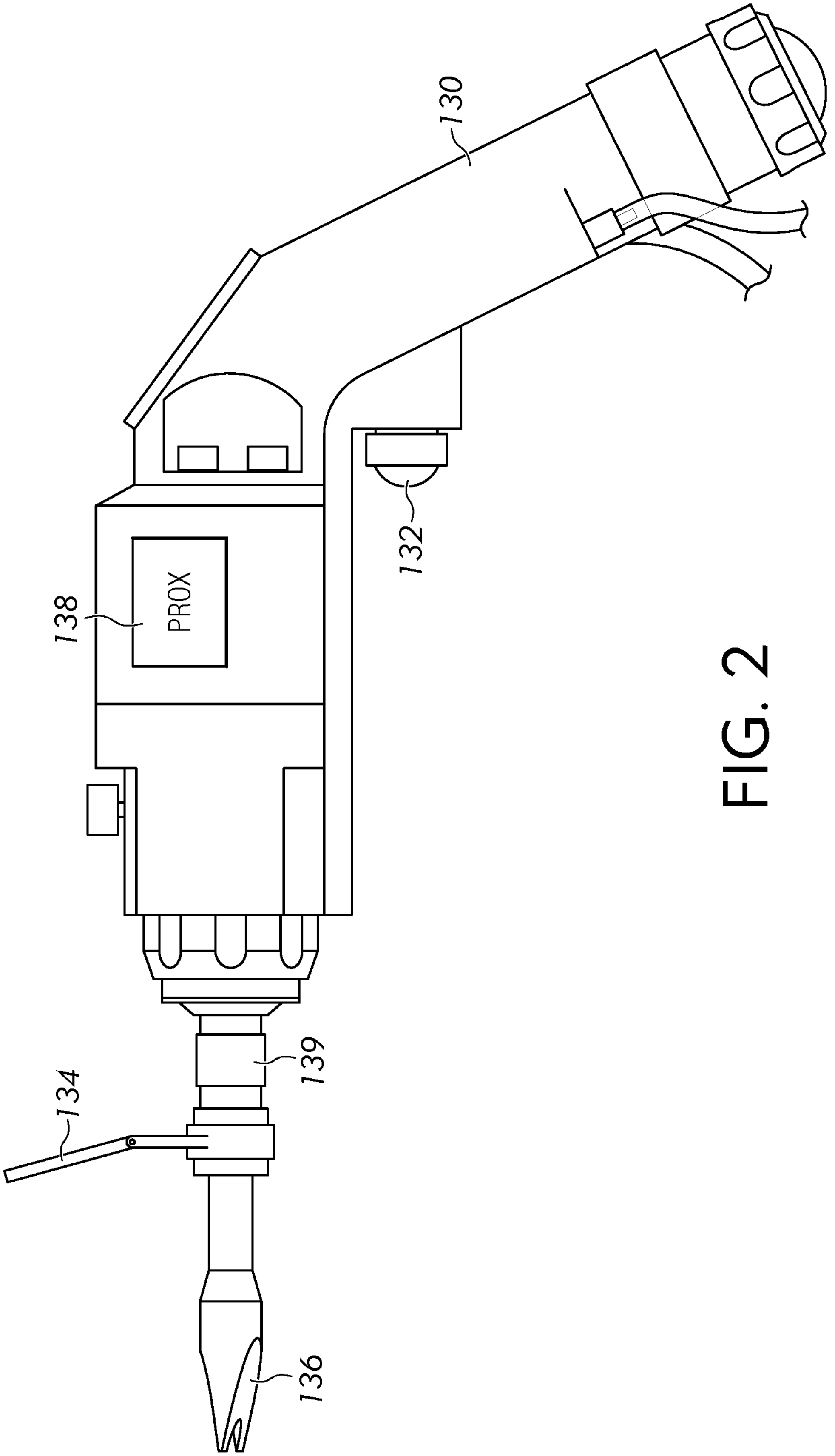
FIG. 2 shows a handheld laser welding torch.

FIG. 2 shows the handheld laser welding torch 130 in further detail. The torch 130 can include a trigger 132 for activating and deactivating the laser light during welding. In certain embodiments, the torch 130 can include a laser light guard 134 that blocks reflected laser light (e.g., reflected from the workpiece during welding). The laser light guard 134 can be mounted at a distal end of the torch 130, such as near a nozzle 136 of the torch. In certain embodiments, the laser light guard 134 can attenuate or filter laser reflections while allowing an operator to view the weld zone through the laser light guard, such as through a lens on the guard. The laser light guard 134 can help protect the operator's eyes from laser reflections during welding/cutting. The protective helmet 160 and/or laser shielding glasses 170 can provide additional eye protection for the operator. If desired, the laser welding system 100 can include barriers/curtains around a welding work area to provide further protection against laser light 118 emitted from the torch 130.

The laser welding system 100 can include various features to help ensure that the laser light 118 is only activated when the torch 130 is near or adjacent to or pointed toward a workpiece W. Such features can prevent the accidental emission of laser light into free space or in an otherwise unwanted or unintended direction (e.g., toward the operator or toward a bystander). In one embodiment, the outer surface of the nozzle 136 of the torch 130 is electrically insulating. The nozzle 136 could be made of a non-conductive material (not electrically conductive), such as ceramic for example, or have an electrically insulating coating. The laser welding system 100 can include a sense lead 142 from the laser power supply 110. The sense lead 142 has the work clamp 140 at its distal end. The work clamp 140 can be used to attach the sense lead 142 from the laser power supply 110 to the workpiece W. The work clamp 140 can include jaws or a bolt device to clamp to the workpiece W. The laser welding system 100 can also include a proximity sensor 138 that is operatively connected to the sense lead 142 and the handheld laser welding torch 130. The proximity sensor 138 is configured to determine whether the torch 130 is adjacent to the workpiece W and generate a corresponding proximity signal, so that the laser light will not be activated while the torch is at a distance from the workpiece. The proximity signal is sent to the controller 114 in the laser power supply 110, so that the controller knows when the torch 130 is near or adjacent to the workpiece. Example types of proximity sensors can include, but are not limited to, magnetic proximity sensors, inductive proximity sensors, capacitive proximity sensors, etc. The proximity sensor 138 is shown schematically as being located in or on the torch 130 in FIG. 2. The proximity sensor 138 is intended to work in conjunction with the sense lead 142 and work clamp 140 to determine whether the torch 130 is adjacent to the workpiece W. For example, the work clamp 140 must be attached to the workpiece W for the proximity sensor 138 to detect that the torch 130 is adjacent to the workpiece. The electrically insulating material or outer surface of the nozzle 136 can prevent the work clamp 140 from being directly connected to the nozzle in order to defeat the system's capability of detecting the proximity of the torch 130 to the workpiece W. A ceramic or otherwise electrically insulating cover on the nozzle 136 can prevent connecting the sense lead 142/work clamp 140 directly to the torch 130 instead of to the workpiece W, and can also prevent the nozzle from becoming too hot. In certain embodiments, the sense lead 142 can include a magnet at its distal end rather than the work clamp, to attach the sense lead to the workpiece W. In this case, the nozzle 136 can be made from a nonmagnetic material (e.g., aluminum, brass, ceramic, certain stainless steels, etc.) so that the magnet from the sense lead 142 cannot be attached to the nozzle 136 in order to defeat the system's capability of detecting the proximity of the torch 130 to the workpiece W.

In certain embodiments, the torch 130 can include a pressure sensor 139 to allow the torch to operate with a pressure contact nozzle similar to the nose of a nail gun, such that the laser light 118 will not be activated unless the operator is pressing the nozzle 136 against the workpiece W. The pressure sensor 139 can sense or measure or otherwise respond to an axial pressure level applied to the nozzle 136, and generate a corresponding pressure or pressure level signal based on the axial pressure applied to the nozzle by the workpiece. In one example embodiment, the pressure sensor 139 includes a strain gauge for measuring the pressure applies to the nozzle 136. In another example embodiment, the pressure sensor 139 includes a switch that is actuated (e.g., closed or opened) when the axial pressure level applied to the nozzle 136 meets or exceeds a threshold level. One of ordinary skill in the art will appreciate other types of pressure sensors that could be used to provide the torch 130 with functionality similar to the nose of a nail gun, such as piezoelectric or capacitive pressure sensors, solid state sensors, optical sensors, or MEMS devices for example.

The pressure or pressure level signal from the pressure sensor 139 and the proximity signal from the proximity sensor 138 are both sent to the controller 114 in the laser power supply 110. The controller 114 receives these signals to determine whether the torch 130 is proximate or adjacent to the workpiece W and pressed against the workpiece. The controller 114 is configured to activate the laser light 118 when the pressure level applied to the nozzle 136 meets or exceeds a threshold pressure level and the proximity signal indicates that the torch 130 is adjacent to the workpiece. A further condition for activating the laser light 118 can be the pulling of the trigger 132 on the torch 130. However, in certain embodiments, pulling of the trigger 132 is not necessary to activate the laser light 118, and merely pressing the nozzle 136 against the workpiece W with the sense lead 142 attached to the workpiece will cause the controller 114 to activate the laser light. The controller 114 can compare the pressure level signal from the pressure sensor 139 to a stored threshold pressure level to determine whether the torch 130 is pressed against the workpiece W. Alternatively, the comparison can be done mechanically via a bias mechanism in the torch 130. For example, pressing the nozzle 136 against the workpiece W with sufficient force meeting or exceeding the threshold can actuate a switch in the torch 130 that then generates the pressure level signal. In this case, the controller 114 would not have to compare the pressure level signal to a stored threshold because the presence of the pressure level signal would indicate that sufficient pressure has been applied to the nozzle 136. The controller 114 can also compare the proximity signal from the proximity sensor 138 to a stored threshold proximity level to determine whether the torch 130 is adjacent to the workpiece W.

In certain embodiments, the laser power supply 110 can include software lockouts that prevent unauthorized individuals from operating the laser torch 130. In one embodiment, an operator must first go through a safety training class, pass the safety training class, and then receive an operator code which the operator uses to enable the laser welding system 100. The operator does not receive the operator code until passing the safety training class. The code may be provided in one of any number of different ways (e.g., in a text message, in an email, encoded in an RFID tag, or an encoded badge, etc.). The user interface 116 of the laser power supply can be configured to receive an input of the operator code, such as by scanning an RFID tag or QR code associated with the operator, or receiving a manual input of the code by the operator (e.g., manual input of an alphanumeric code). The controller 114 verifies the operator code and enables the activation of laser light only after the operator code is verified.

Figure 3:
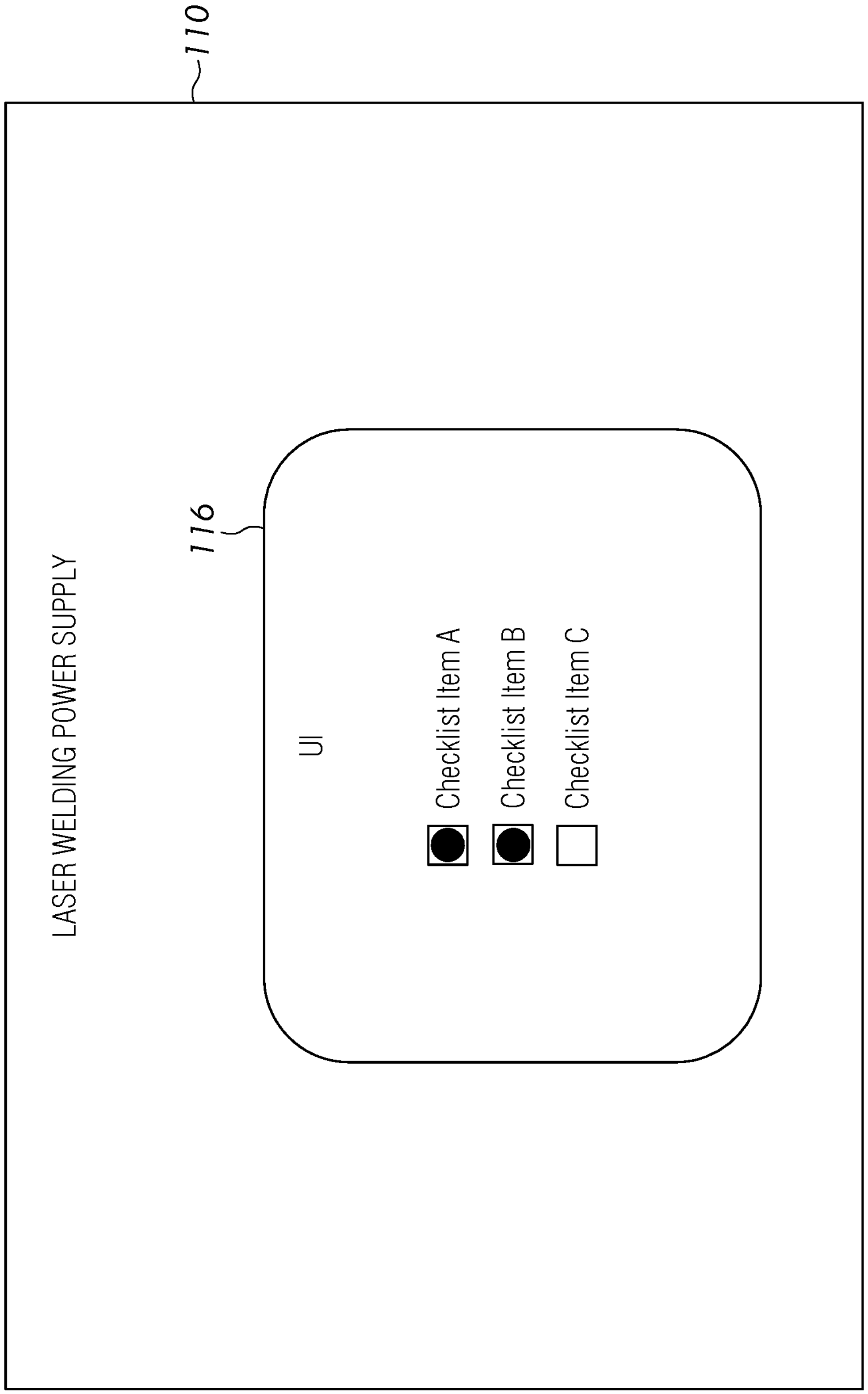
FIG. 3 shows a user interface of a laser power supply.

As can be seen in FIG. 3, in certain embodiments, the user interface 116 can be configured to display a checklist. The controller 114 verifies a plurality of acknowledgement inputs from the operator corresponding to respective elements of the checklist and enables the activation of laser light only after the plurality of acknowledgment inputs are verified. In FIG. 3, the example checklist displayed on the user interface 116 has three elements (checklist items A, B, and C), of which the first two have received acknowledgement inputs. The elements of the checklist can correspond to steps or actions that the operator must perform before performing laser welding. In one embodiment, an entire safety kit is provided which can be set up to provide various safety features around the laser welding work area. The safety kit may include safety PPE, barriers, and sensors, for example. The checklist displayed on the user interface 116 can be provided so that the operator has to go through and acknowledge each item in the checklist (e.g., by pressing a button to touch sensitive display area) before the laser welding operation can proceed. The checklist may require the operator to acknowledge that laser safety PPE (e.g., laser safety glasses (or equivalent), laser safe gloves) are being properly worn, and that a laser safety officer is present, for example. In one embodiment, the checklist may require that an anti-reflective coating be applied to the workpiece. The anti-reflective coating goes on the work piece as a liquid and dries before welding is started. The anti-reflective coating mitigates the reflection of infrared energy (produced by the laser beam) from the workpiece. Similarly, the checklist may require use of an anti-reflective shielding gas (e.g., water vapor, CO2). The anti-reflective shielding gas mitigates the reflection of infrared energy (produced by the laser beam) at and near the weld puddle.

In some embodiments of the laser welding system, the system can include an area scanner that scans for RFID tags around the welding area to ensure safety from reflections of laser energy. For example, if a person enters an area where laser welding is taking place, a scanner of the laser welding system will detect an RFID tag worn by the person and shut down the laser of the laser welding device. In such an embodiment, persons who have access to the laser welding facility are required to wear such RFID tags as part of the safety process. In certain embodiments, the laser welding system 100 can include non-operator proximity sensors to keep non-laser operators away from an active laser. This may be accomplished by having a video monitoring system to detect any humans in the welding area. When a non-laser operator is detected in or near the welding area, the laser light may be automatically shut down (e.g., via wireless communication between the video monitoring system and the laser power supply 110). Other monitoring systems may be employed in a similar manner, in accordance with other embodiments, including for example a thermal monitoring system, a touch sensing monitoring system, or an RFID monitoring system.

In some embodiments, the helmet 160 can sense the presence of laser light. Reflecting laser light (laser energy) can cause damage to the head and eyes of a user during a laser welding process. A sensor capable of detecting the laser energy can be incorporated into the user's protective welding helmet 160 (e.g., on the inside of the helmet, which also has a laser light filter). The welding helmet 160 is further configured to communicate with the laser power supply 110 or torch 130. In one embodiment, when the sensor in the welding helmet 160 detects laser energy during a laser welding process, a signal is sent to the laser power supply 110 (e.g., to the controller 114) or the torch 130 and shuts down the laser. An error symbol or text may be presented on a display of the welding helmet 160 or of the laser power supply 110 to indicate the issue to the user. If laser light manages to get into the interior of the helmet 160, such as around the neck portion of the helmet, the laser light sensor within the helmet can shut off the laser light. The laser welding system 100 can also include at least one sensor configured to sense laser energy which occurs outside of the immediate work area, and shut down the laser welding system accordingly for safety reasons.

In one embodiment, the laser beam of the torch 130 is used to track the weld joint. If the laser beam drifts out of the weld joint, the system can shut down the laser beam and/or provide a warning to the user.

In certain embodiments, the torch 130 can include one or more light-emitting diodes (LEDs) to illuminate a weld puddle during the welding operation, to improve visibility of the weld and weld puddle to the user. The torch 130 can also include an Emergency-Stop (E-Stop) device to disable the laser, in particular if the torch lacks a trigger to activate the laser light. In one embodiment, a visible (e.g., red) laser guide light in the torch 130 is activated first upon pulling the trigger 132 to a first trigger position. The guide light turns off when the laser is activated upon pulling the trigger 132 to a second trigger position. The red laser guide light can be used to help find and align the tip of the handheld laser device with a joint on a workpiece to be welded. Use of a visible laser or LED to illuminate the weld puddle, or to constantly illuminate the actual direction of welding with respect to the joint during welding may also be incorporated into the torch 130.

In certain embodiments, the torch 130 can include mirrors to wobble the laser beam and provide a wider and/or adjustable weld puddle. Adjustable wobble settings can be provided on the torch 130 via suitable control devices. Alternatively, the laser beam can be defocused to provide a wider laser beam. The torch 130 can also include different interchangeable nozzle types and sizes, corresponding to different types of welds to be formed.

One embodiment of a handheld laser welding system includes an angle monitor and vision system to ensure that a handheld laser device is being used safely. For example, an angle monitoring device is programmed or "taught" (e.g., via a dry run of the weld using the handheld laser welding torch with the laser off) proper angle and position of the handheld laser device for a particular application to ensure safety. In one embodiment, a vision system (having a camera, etc.) is used to ensure proper use of the handheld laser device by the user. The laser is shut off if the handheld laser device gets out of position (within some tolerance) for a particular welding procedure (via position monitoring using cameras or inertial sensors, for example).

In one embodiment, the torch 130 includes an optical port mount that allows a digital camera to be mounted to the optics of the laser, allowing a user to see the weld puddle area better without having to weld up close. The torch 130 further includes a display device operatively connected to the digital camera to allow the user to view the imagery (e.g., video) collected by the digital camera. In this manner, the user does not have to be overly close to the weld puddle area to see what is happening. In a further embodiment, the torch 130 includes a camera mounted at the front or distal end of the torch, functioning as a laser view finder, to be able to view the weld puddle. The torch 130 further includes a display device operatively connected to the camera to allow the user to view the imagery (e.g., video) collected by the camera.

In one embodiment, vision sensing and RFID technology are used to sense a position of an operator's head while welding. The position can be compared to a laser line-of-sight and/or angles of laser light reflections associated with using a handheld laser device. Warnings can be provided and/or the laser can be shut down when the comparison indicates potential danger to the operator. Also, in one embodiment, a non-operator proximity sensor having a camera that is aligned with a line-of-sight of a handheld welding gun during welding is provided. When a non-operator comes into that line-of-sight, the laser is shut down. Furthermore, the operator and other persons in the area may be monitored for personal protective equipment (PPE), and the laser can be shut down and alarms activated when someone is not in compliance with PPE regulations.

In one embodiment, a welding helmet 160 with augmented reality (AR) capability is provided which displays an AR symbol on a head-up display (HUD) of the welding helmet, indicating a location of the weld joint. Another system that actually finds/tracks the weld joint and communicates with the welding helmet to display the AR symbol in the proper location in the field of view may also be provided. For example, in one embodiment, the laser from the torch 130 tracks the weld joint and the torch communicates the tracking information to the welding helmet 160. For example, in another embodiment, an angle monitoring device is programmed or "taught" (e.g., via a dry run of the weld using the laser welding torch 130 with the laser off) the path of the weld joint which the helmet 160 uses to display the location of the weld joint via AR.

Figure 4:
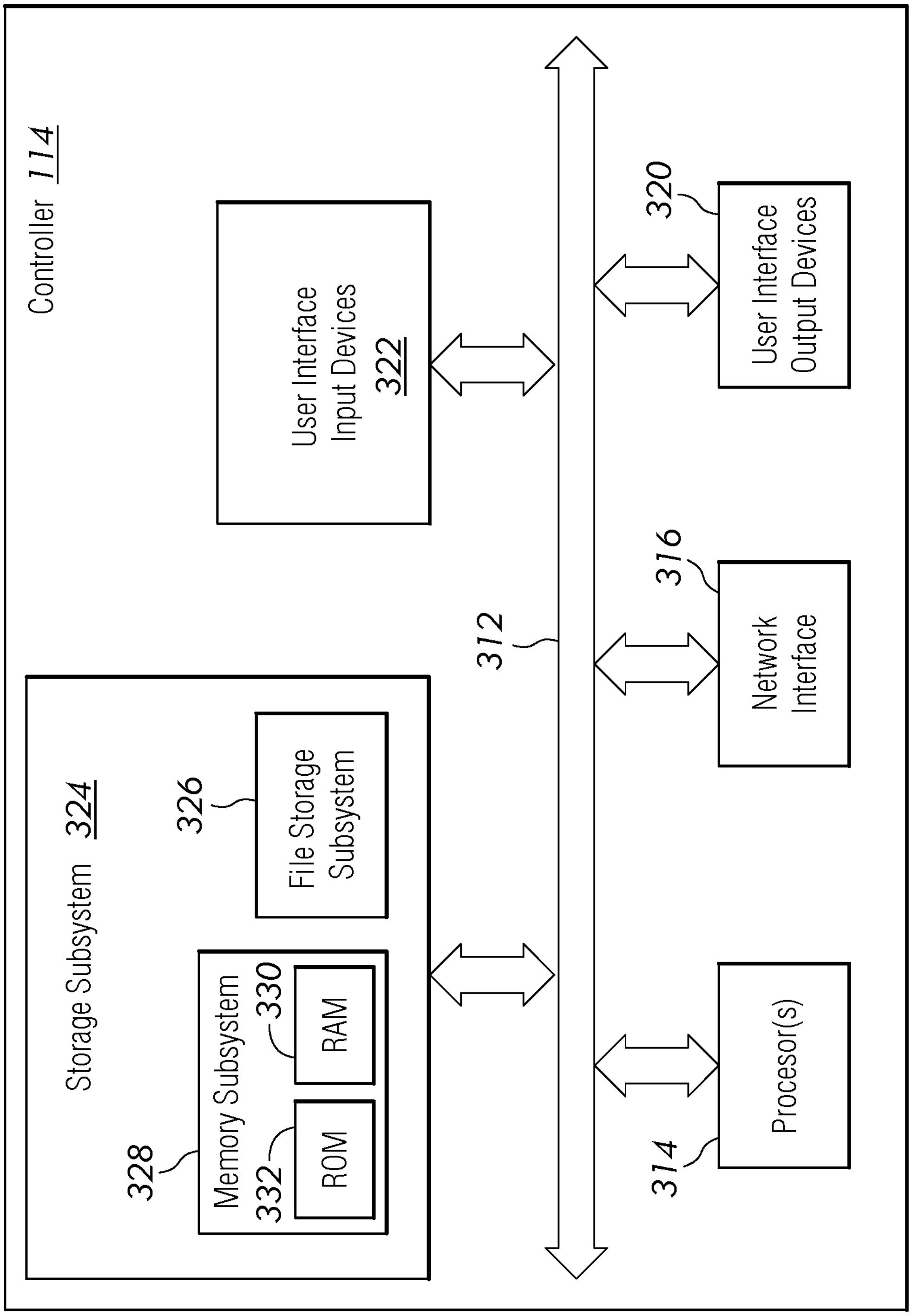
FIG. 4 illustrates a block diagram of an example embodiment of a controller that can be used, for example, in the laser welding system of FIG. 1.

FIG. 4 illustrates a block diagram of an example embodiment of a controller 114 that can be used, for example, in the handheld laser welding system 100 of FIG. 1. For example, the controller 114 is located within the laser power supply 110 as shown in FIG. 1. Referring to FIG. 4, the controller 114 includes at least one processor 314 (e.g., a microprocessor, a central processing unit, a graphics processing unit) which communicates with a number of peripheral devices via bus subsystem 312. These peripheral devices may include a storage subsystem 324, including, for example, a memory subsystem 328 and a file storage subsystem 326, user interface input devices 322, user interface output devices 320, and a network interface subsystem 316. The input and output devices allow user interaction with the controller 114 and correspond to the user interface 116 shown in FIG. 1. Network interface subsystem 316 provides an interface to outside networks and is coupled to corresponding interface devices in other devices.

User interface input devices 322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 114 or onto a communication network.

User interface output devices 320 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 114 to the user or to another machine or computer system.

Storage subsystem 324 stores programming and data constructs that provide some or all of the functionality described herein. For example, computer-executable instructions and data are generally executed by processor 314 alone or in combination with other processors. Memory 328 used in the storage subsystem 324 can include a number of memories including a main random access memory (RAM) 330 for storage of instructions and data during program execution and a read only memory (ROM) 332 in which fixed instructions are stored. A file storage subsystem 326 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 326 in the storage subsystem 324, or in other machines accessible by the processor(s) 314.

Bus subsystem 312 provides a mechanism for letting the various components and subsystems of the controller 114 communicate with each other as intended. Although bus subsystem 312 is shown schematically as a single bus, alternative embodiments of the bus subsystem may use multiple buses.

The controller 114 can be of varying types. Due to the ever-changing nature of computing devices and networks, the description of the controller 114 depicted in FIG. 4 is intended only as a specific example for purposes of illustrating some embodiments. Many other configurations of a controller are possible, having more or fewer components than the controller 114 depicted in FIG. 4.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A laser welding system, comprising:

a laser power supply comprising a controller that controls activation of laser light by the laser power supply;

a sense lead attachable to a workpiece to be welded; and a handheld laser welding torch operatively connected to the laser power supply to receive the laser light from the laser power supply, wherein the handheld laser welding torch includes:

a nozzle having an electrically insulating outer coating that provides an electrically non-conductive surface; and a pressure sensor that measures a pressure level applied to the nozzle and generates a corresponding pressure level signal, wherein the laser welding system further comprises a proximity sensor operatively connected to the sense lead and the handheld laser welding torch and configured to determine whether the handheld laser welding torch is adjacent to the workpiece and generate a corresponding proximity signal, and wherein the controller receives the pressure level signal from the pressure sensor and the proximity signal from the proximity sensor, and wherein the controller is configured to activate the laser light when the pressure level applied to the nozzle meets or exceeds a threshold and the proximity signal indicates that the handheld laser welding torch is adjacent to the workpiece, wherein the laser power supply further comprises a user interface operatively connected to the controller, wherein the user interface is configured to receive an input of an operator code that identifies an operator authorized to operate the laser welding system, and wherein the controller is configured to verify the operator code and enable activation of the laser light after the operator code is verified.

2. The laser welding system of claim 1, further comprising a wire feeder that feeds a consumable wire to the handheld laser welding torch.

3. The laser welding system of claim 1, wherein the sense lead comprises a work clamp.

4. The laser welding system of claim 1, wherein the pressure sensor comprises a strain gauge.

5. The laser welding system of claim 1, wherein the pressure sensor comprises a switch that is actuated when the pressure level applied to the nozzle meets or exceeds said threshold, and actuation of the switch generates said corresponding pressure level signal.

6. The laser welding system of claim 1, wherein the handheld laser welding torch includes a laser light guard that blocks reflected laser light.

7. The laser welding system of claim 1, wherein the user interface is configured to display a checklist, and wherein the controller is configured to verify a plurality of acknowledgement inputs corresponding to respective elements of the checklist and enable activation of the laser light after the plurality of acknowledgment inputs are verified.

8. A laser welding system, comprising:

a laser power supply comprising a controller that controls activation of laser light by the laser power supply;

a sense lead attachable to a workpiece to be welded;

a handheld laser welding torch operatively connected to the laser power supply to receive the laser light from the laser power supply, wherein the handheld laser welding torch includes:

a nozzle; and a pressure sensor that senses a pressure level applied to the nozzle and generates a corresponding pressure signal, wherein the laser welding system further comprises a proximity sensor operatively connected to the sense lead and the handheld laser welding torch and configured to determine whether the handheld laser welding torch is adjacent to the workpiece and generate a corresponding proximity signal, and wherein the controller receives the pressure signal from the pressure sensor and the proximity signal from the proximity sensor, and wherein the controller is configured to activate the laser light when the pressure level applied to the nozzle meets or exceeds a threshold and the proximity signal indicates that the handheld laser welding torch is adjacent to the workpiece, and wherein the laser power supply further comprises a user interface operatively connected to the controller, wherein the user interface is configured to receive an input of an operator code that identifies an operator authorized to operate the laser welding system, and wherein the controller is configured to verify the operator code and enable activation of the laser light after the operator code is verified.

9. The laser welding system of claim 8, further comprising a wire feeder that feeds a consumable wire to the handheld laser welding torch.

10. The laser welding system of claim 8, wherein the sense lead comprises a magnet and the nozzle has a non-magnetic outer surface.

11. The laser welding system of claim 8, wherein the pressure sensor comprises a strain gauge.

12. The laser welding system of claim 8, wherein the pressure sensor comprises a switch that is actuated when the pressure level applied to the nozzle meets or exceeds said threshold, and actuation of the switch generates said corresponding pressure level signal.

13. The laser welding system of claim 8, wherein the handheld laser welding torch includes a laser light guard that blocks reflected laser light.

14. The laser welding system of claim 8, wherein the user interface is configured to display a checklist, and wherein the controller is configured to verify a plurality of acknowledgement inputs corresponding to respective elements of the checklist and enable activation of the laser light after the plurality of acknowledgment inputs are verified.

15. A laser welding system, comprising:

a laser power supply comprising a controller that controls activation of laser light by the laser power supply;

a sense lead attachable to a workpiece to be welded; and a handheld laser welding torch operatively connected to the laser power supply to receive the laser light from the laser power supply, wherein the handheld laser welding torch includes:

a nozzle having an electrically insulating outer coating that provides an electrically non-conductive surface; and a pressure sensor that generates a pressure signal based on a pressure level applied to the nozzle, and means for determining that the handheld laser welding torch is adjacent to a workpiece to be welded and generating a corresponding proximity signal, wherein the controller receives both of the pressure signal and the proximity signal and wherein the controller is configured to activate the laser light when the pressure level applied to the nozzle meets or exceeds a threshold and the proximity signal indicates that the handheld laser welding torch is adjacent to the workpiece, wherein the laser power supply further comprises a user interface operatively connected to the controller, wherein the user interface is configured to receive an input of an operator code that identifies an operator authorized to operate the laser welding system, and wherein the controller is configured to verify the operator code and enable activation of the laser light after the operator code is verified.

16. The laser welding system of claim 15, further comprising a wire feeder that feeds a consumable wire to the handheld laser welding torch.

17. The laser welding system of claim 15, wherein the sense lead comprises a magnet and the nozzle has a non-magnetic outer surface.

18. The laser welding system of claim 15, wherein the pressure sensor comprises a strain gauge.

19. The laser welding system of claim 15, wherein the pressure sensor comprises a switch that is actuated when the pressure level applied to the nozzle meets or exceeds said threshold, and actuation of the switch generates said corresponding pressure level signal.

20. The laser welding system of claim 15, wherein the user interface is configured to display a checklist, and wherein the controller is configured to verify a plurality of acknowledgement inputs corresponding to respective elements of the checklist and enable activation of the laser light after the plurality of acknowledgment inputs are verified.

21. A laser welding system, comprising:

a laser power supply comprising a controller that controls activation of laser light by the laser power supply;

a sense lead attachable to a workpiece to be welded; and a handheld laser welding torch operatively connected to the laser power supply to receive the laser light from the laser power supply, wherein the handheld laser welding torch includes:

a nozzle having an electrically insulating outer coating that provides an electrically non-conductive surface; and a pressure sensor that generates a pressure signal based on a pressure level applied to the nozzle, and means for determining that the handheld laser welding torch is adjacent to a workpiece to be welded and generating a corresponding proximity signal, wherein the controller receives both of the pressure signal and the proximity signal and wherein the controller is configured to activate the laser light when the pressure level applied to the nozzle meets or exceeds a threshold and the proximity signal indicates that the handheld laser welding torch is adjacent to the workpiece, wherein the laser welding system further comprises a helmet configured to communicate with the laser power supply or the handheld laser welding torch, wherein the helmet is further configured to detect presence of the laser light within the helmet and send a corresponding signal to the laser power supply or the handheld laser welding torch.

22. A laser welding system, comprising:

a laser power supply comprising a controller that controls activation of laser light by the laser power supply;

a sense lead attachable to a workpiece to be welded; and a handheld laser welding torch operatively connected to the laser power supply to receive the laser light from the laser power supply, wherein the handheld laser welding torch includes:

a nozzle having an electrically insulating outer coating that provides an electrically non-conductive surface; and a pressure sensor that measures a pressure level applied to the nozzle and generates a corresponding pressure level signal, wherein the laser welding system further comprises a proximity sensor operatively connected to the sense lead and the handheld laser welding torch and configured to determine whether the handheld laser welding torch is adjacent to the workpiece and generate a corresponding proximity signal, and wherein the controller receives the pressure level signal from the pressure sensor and the proximity signal from the proximity sensor, and wherein the controller is configured to activate the laser light when the pressure level applied to the nozzle meets or exceeds a threshold and the proximity signal indicates that the handheld laser welding torch is adjacent to the workpiece, wherein the laser welding system further comprises a helmet configured to communicate with the laser power supply or the handheld laser welding torch, wherein the helmet is further configured to detect presence of the laser light within the helmet and send a corresponding signal to the laser power supply or the handheld laser welding torch.

23. The laser welding system of claim 8, further comprising a helmet configured to communicate with the laser power supply or the handheld laser welding torch, wherein the helmet is further configured to detect presence of the laser light within the helmet and send a corresponding signal to the laser power supply or the handheld laser welding torch.

* * * * *